United States Patent [19]
Albrecht et al.

[11] 3,887,215
[45] June 3, 1975

[54] SAFETY STEERING FOR MOTOR VEHICLES

[75] Inventors: Wilhelm Albrecht, Vaihingen/Enz; Helmut Patzelt, Fellbach; Peter-Matthias Hoheisel, Esslingen, all of Germany

[73] Assignee: Daimler-Benz Aktiengesellschaft, Germany

[22] Filed: Oct. 4, 1973

[21] Appl. No.: 403,531

[30] Foreign Application Priority Data
Oct. 5, 1972 Germany............................ 2248925

[52] U.S. Cl............................ 280/150 AB; 280/87 R
[51] Int. Cl............................................. B60r 21/10
[58] Field of Search......... 280/150 AB, 150 B, 87 R; 74/552

[56] References Cited
UNITED STATES PATENTS

| | | | |
|---|---|---|---|
| 3,483,770 | 12/1969 | Eibl et al. ............................... | 74/552 |
| 3,532,360 | 10/1970 | Leising et al. ................. | 280/150 AB |
| 3,674,284 | 4/1972 | Lohr............................ | 280/150 AB |
| 3,773,352 | 11/1973 | Radke .......................... | 280/150 AB |
| 3,774,932 | 11/1973 | Schiesterl ..................... | 280/150 AB |
| 3,819,205 | 6/1974 | Dunford et al. .............. | 280/150 AB |

FOREIGN PATENTS OR APPLICATIONS

| | | | |
|---|---|---|---|
| 1,948,615 | 4/1971 | Germany...................... | 280/150 AB |

*Primary Examiner*—Kenneth H. Betts
*Attorney, Agent, or Firm*—Craig & Antonelli

[57] ABSTRACT

A safety steering device for motor vehicles, in which a plastically deformable deformation member is arranged between the steering wheel and the upper end of the steering spindle, and in which a gas cushion adapted to be automatically inflated, when exceeding a predetermined vehicle deceleration, is additionally provided; the gas cushion is thereby combined into a structural unit with the generator producing the gases which structural unit is accommodated above the deformation member inside a padded plate whose top side lies essentially in the plane of the steering wheel rim.

10 Claims, 1 Drawing Figure

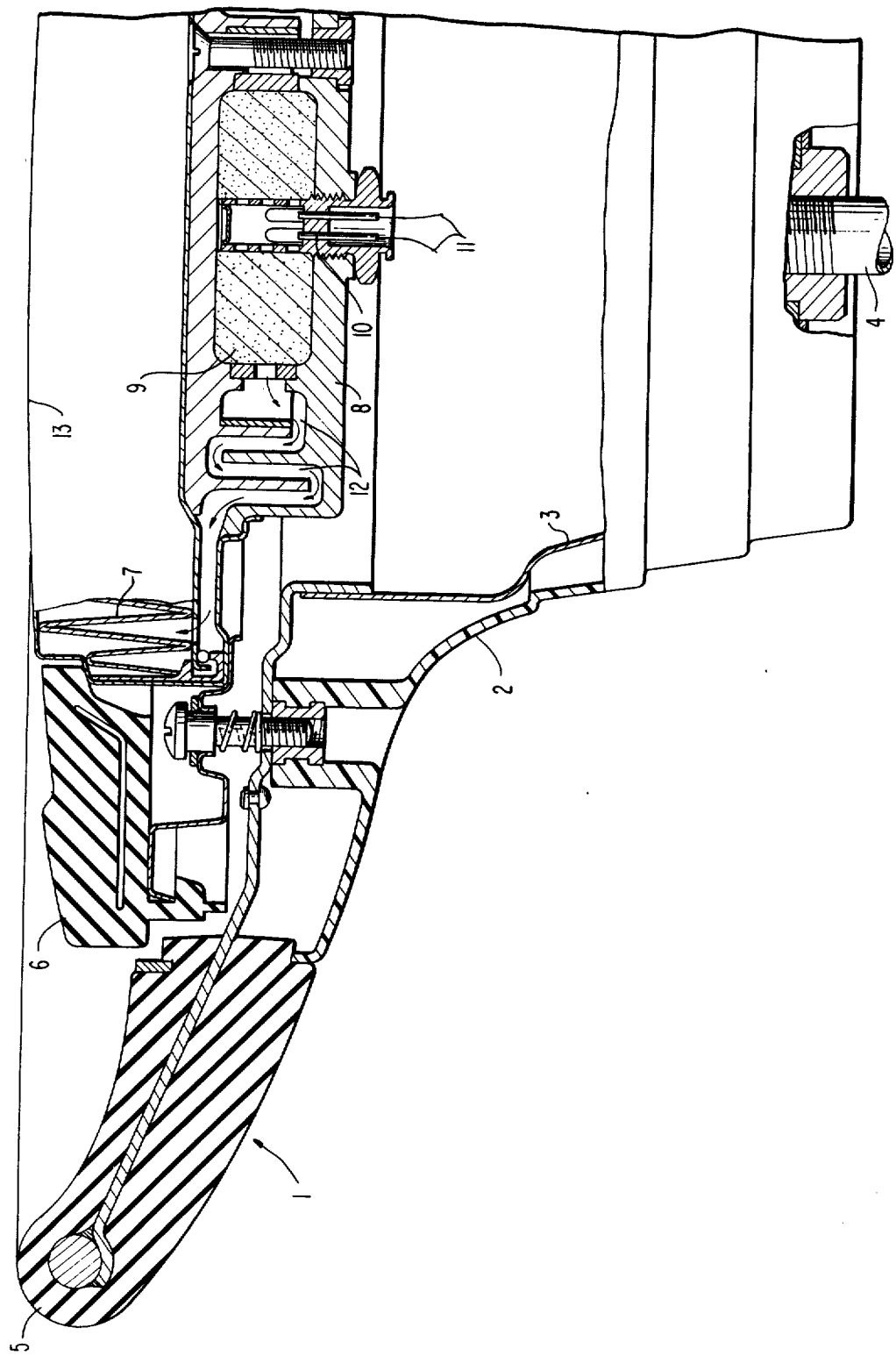

SAFETY STEERING FOR MOTOR VEHICLES

The present invention relates to a safety steering arrangement for motor vehicles, in which a plastically deformable deformation member is arranged between the steering wheel and the upper end of the steering spindle, and in which additionally a gas cushion adapted to be automatically inflated upon exceeding a predetermined vehicle deceleration is provided within the area of the steering wheel.

In a known safety steering device of this type (German Offenlegungsschrift 2,034,008, laid open on Jan. 13, 1972) the generator serving for the production of the gases necessary for filling the gas cushion is arranged inside the deformation member within the area of a hub serving the connection with the steering spindle, whereas the gas cushion disposed is accommodated in the normal (non-inflated) condition in a gas-permeable container which is secured at the side of the deformation member facing the steering wheel. However, this arrangement entails the disadvantages that the structural volume of the gas generator is strongly limited by reason of its arrangement within the area of the hub, because the possible diameter thereof is determined by the diameter of the deformation member and the height can only be so selected that the completely satisfactory deformation of the deformation member is not impaired in case of an accident. It has also been found as a further disadvantage of this prior art arrangement that by reason of the fact that at the beginning of the gas generation, at first the interior space of the deformation member has to be filled, the unfolding of the gas cushion is delayed.

It has also been already proposed to combine the gas cushion and the generator into a structural unit and to accommodate the same on the inside of a V-shaped steering wheel spoke (German Auslegungsschrift 2,109,463, available on May 25, 1972). However, also with this prior art construction the gas generator is arranged within the area of the steering wheel hub so that very narrow limits are again imposed on its dimension in the radial direction, which may lead to disadvantages as regards the surface of the gas producing substance as well as with respect to the conduction and cooling of the gas.

The present invention is therefore concerned with the task to avoid these disadvantages of the prior art arrangements and to provide a safety steering device of the aforementioned type, which enables a wide latitude for the construction of the gas generator.

The underlying problems are solved according to the present invention in that the gas cushion is combined together with a generator serving for the gas production into a structural unit and that this structural unit is accommodated above the deformation member within a padded plate, whose top surface lies essentially in the plane of the steering wheel rim.

Accordingly, it is an object of the present invention to provide a safety steering device for motor vehicles which avoids by simple means the aforementioned shortcomings and drawbacks encountered in the prior art.

Another object of the present invention resides in a safety steering arrangement for motor vehicles in which the gas generator may have a relatively large structural volume.

A further object of the present invention resides in a safety steering arrangement with a gas generator and inflatable gas cushion in which the unfolding of the gas cushion is not unduly delayed.

Still another object of the present invention resides in a safety steering which does not impose undue limitations as regards the exposed surface of the gas producing substances and/or as regards the gas conduction and gas cooling.

Another object of the present invention resides in a safety steering system which includes a gas generator and an inflatable cushion which is not only simple in construction and easy to install but also offers a wide latitude for the design and construction of the gas generator.

These and other objects, features and advantages of the present invention will become more apparent from the following description when taken in connection with the accompanying drawing which shows, for purposes of illustration only, one embodiment in accordance with the present invention, and wherein:

The single FIGURE is a partial cross-sectional view through one embodiment of a safety steering device for motor vehicles in accordance with the present invention.

Referring now to the single FIGURE of the drawing, the steering wheel generally designated by reference numeral 1 which is illustrated in the drawing in cross-section, is connected with the upper end of the steering spindle 4 by the interconnection of a deformation member 3, a so-called impact pot, surrounded by a synthetic plastic covering 2 of any known material. A padded plate 6 is arranged on the inside of the steering wheel rim 5, whose top side lies approximately in the plane of the steering wheel rim 5. The padded plate 6 is thereby so constructed that it serves simultaneously as a means for producing signals by conventional means. A folded-together gas cushion 7 is accommodated inside the center portion of the padded plate 6; the gas cushion 7 thereby forms in this area simultaneously the padding and is combined into a readily exchangeable unit with a gas generator 8 arranged therebelow and threadably connected with parts of the steering wheel 1. The generator 8 contains a gas producing combustion or burning charge 9 which can be ignited by way of a conventional ignitor 10 that is operatively connected by way of lines 11 with a sensor (not shown) responding to a predetermined vehicle deceleration. The gas which is developed, thereby flows through a labyrinth 12, in which it is cooled off, and then enters the gas cushion 7.

The filling gas cushion 7 thereby bursts open the gas cushion covering 13 of the padded plate 6 which may consist, for example, of a synthetic plastic sheet provided with intended breaking places.

A further advantage of an arrangement according to the present invention resides in the fact that a normal steering wheel can be converted into a steering wheel constructed optimally correct as regards safety by the mere exchange of the padded plate and the slip-ring which then has to have three instead of two contact possiblities.

While we have shown and described only one embodiment in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

What we claim is:

1. A safety steering device for a vehicle comprising plastically deformable deformation means arranged between a steering wheel and the upper end of a steering spindle, padded plate means arranged inside the steering wheel rim, said padded plate means having a surface lying approximately in the plane of the steering wheel rim, and a structural unit including gas cushion means for automatically inflating upon a predetermined condition of the vehicle and gas generator means for producing inflating gas into said gas cushion means upon said predetermined condition, said structural unit being arranged between said deformation means and said padded plate means wherein said padded plate means surrounds a portion of said gas cushion means lying approximately in the plane of the steering wheel rim, said gas cushion means being arranged in a folded-together state prior to the occurrence of said predetermined condition and surrounded at a central area of the padded plate means, the folded-together gas cushion means simultaneously forming padding within the central area.

2. A safety steering device according to claim 1, wherein said gas generator means is arranged between said gas cushion means and said deformation means.

3. A safety steering device according to claim 2, wherein said structural unit is threadably secured to the steering wheel to form a readily exchangeable structural unit.

4. A safety steering device according to claim 3, wherein said gas generator means includes an ignition charge which upon ignition produces said inflating gas, and labyrinth means for passing said inflating gas prior to entry into said gas cushion means, said labyrinth means providing cooling of said inflating gas prior to entry into said gas cushion means.

5. A safety steering device according to claim 4, wherein said labyrinth means is constructed of a plurality of elongated members offset from one another to form at least an S-shaped channel through which said inflating gases flow to said gas cushion means from said gas generator means.

6. A safety steering device according to claim 5, wherein said plurality of elongated members are constructed in said structural unit.

7. A safety steering device according to claim 1, wherein said gas generator means includes an ignition charge which upon ignition produces said inflating gas, and labyrinth means for passing said inflating gas prior to entry into said gas cushion means, said labyrinth means providing cooling of said inflating gas prior to entry into said gas cushion means.

8. A safety steering device according to claim 7, wherein said labyrinth means is constructed of a plurality of elongated members offset from one another to form at least an S-shaped channel through which said inflating gases flow to said gas cushion means from said gas generator means.

9. A safety steering device according to claim 8, wherein said plurality of elongated members are constructed in said structural unit.

10. A safety steering device according to claim 1, wherein said structural unit is threadably secured to the steering wheel to form a readily exchangeable structural unit.

* * * * *